Figures 1, 2, 3:
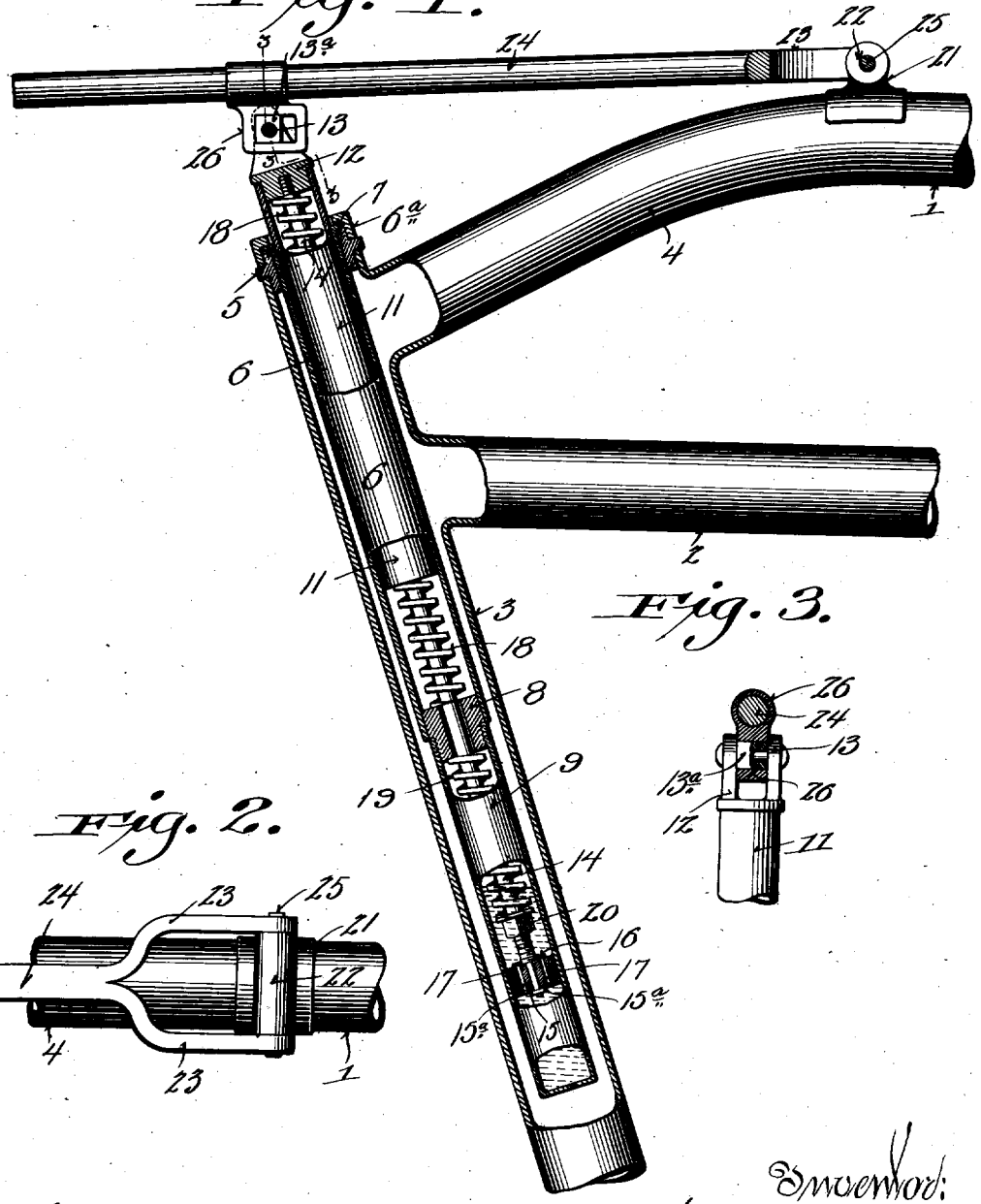

W. S. HARLEY.

SPRING SEAT POST.

APPLICATION FILED DEC. 26, 1911.

Reissued Mar. 12, 1912.

13,383.

Witnesses:
Cassander Young
May Downey.

Inventor:
William S. Harley
By Alphaeus Young
Attorney.

COLUMBIA PLANOGRAPH CO., WASHINGTON, D. C.

UNITED STATES PATENT OFFICE.

WILLIAM S. HARLEY, OF MILWAUKEE, WISCONSIN.

SPRING-SEAT POST.

13,383. Specification of Reissued Letters Patent. Reissued Mar. 12, 1912.

Original No. 979,483, dated December 27, 1910, Serial No. 558,598. Application for reissue filed December 26, 1911. Serial No. 667,997.

*To all whom it may concern:*

Be it known that I, WILLIAM S. HARLEY, a citizen of the United States, residing at Milwaukee, in the county of Milwaukee and State of Wisconsin, have invented a new and useful Spring-Seat Post, of which the following is a specification.

My invention has for its object to provide a resilient seat support for motorcycles, bicycles or like vehicles, the construction and arrangement being such that the required amount of resiliency is obtained, while at the same time rigidity in a lateral direction is insured and back lash due to compression compensated for.

With these objects in view the invention consists in certain peculiarities of construction and combination of parts as set forth hereinafter with reference to the accompanying drawings and subsequently claimed.

In the drawings Figure 1 represents an elevation partly in section of a portion of a motorcycle frame provided with a seat support embodying the features of my invention; Fig. 2, a detail plan view of the hinge connection between the saddle supporting bar and vehicle frame; and Fig. 3, a partially sectional detail view of the shackle connection, the section being taken at a right angle to Fig. 1.

Referring by characters to the drawings, 1 represents the top bar of a motorcycle frame, which bar is supplemented by a second bar 2 arranged parallel thereto, these bars being in brazed connection with a seat-mast 3. At a predetermined distance from the seat-mast the top bar is bent and converges toward the lower bar forming an oblique section 4, whereby the mouth of the seat-mast is lowered to a point below the axis of the upper bar in order that the seat, when placed in position, can be dropped to a convenient point.

The mouth of the mast has brazed therein a gland 5, into which gland is fitted a tubular well that is preferably composed of two sections, the upper section 6 being provided with a flanged end 7 that rests upon the outer end of the gland, said flange being clamped to the gland by means of a flanged coupling member that is in screw-threaded connection with a threaded shank of the gland. The lower end of the upper well section 6 has brazed or otherwise secured thereto a collar 8, having a screw-threaded extension for the reception of the correspondingly screw-threaded end of the lower tube section 9 of said well. This section of the well is closed at its bottom to form a reservoir 10, which, as shown, may, in some instances, be partly filled with oil if desired.

A reciprocative seat-post 11 is fitted into the upper section of the well as shown, being provided with a head 12, that is brazed or otherwise secured thereto. The head 12 is grooved horizontally and is also apertured for the reception of a pin 13, upon which pin is loosely mounted a bearing-block $13^a$. The head has secured thereto a plunger-rod 14 which extends through the seat-post collar 8 that connects the upper and lower well sections, the said collar serving as a guide for the lower end of the plunger-rod. The end of the plunger-rod, which is mounted within tube section 9, is provided with a piston-head 15, which piston-head has ports $15^a$ that are controlled by a valve-disk 16 there being restricted vents 17 also extending through the disk-head, which vents are constantly open while the ports are closed by the disk, when said plunger-rod and piston-head rise.

Interposed between the upper face of the collar 8 and lower face of the head 12 is a coiled spring 18, which coiled spring surrounds the plunger and is adapted to support the load. A second coiled spring 19 is interposed between the lower face of the collar 8 and an adjustable nut and washer 20, the nut being in screw-threaded engagement with the plunger-rod 14, whereby tension of the coiled spring 19 is adjusted simultaneously with adjustment of the upper spring 18.

The lower coiled spring 19 is provided for the purpose of cushioning the up-stroke of the seat-post incidental to sudden depression thereof through shock, whereby shock to the rider is absorbed in either direction, it being understood that the adjusting nut 20 may be set in proportion to the weight of the rider, whereby the proper amount of resiliency is maintained.

Brazed, or otherwise suitably secured to the top-bar 1, at the junction of the oblique portion 4 and horizontal portion, is a bracket 21, which bracket has extending therefrom an apertured ear 22, for the reception of the crotched end 23 of a saddle-bar 24, the crotched end of the saddle-bar being provided with apertures that register with the ear apertures through which a hinged pin 25 passes whereby a rigid hinge connection is formed between the top frame-bar and seat-bar.

Adjacent to the rear end of the saddle-bar there is secured a bracket having a depending horizontally disposed slotted tongue 26 that is slidably fitted into the grooved head 12, the slot in said tongue being engaged by the bearing-block 13ª, whereby the rear end of the saddle-bar is supported. By this tongue and groove connection the seat-post and bar are connected and held rigid in a lateral direction, while at the same time said connection will permit free downward movement of the seat-post within the mast, due to play of the block 13ª within the slot of the tongue 26. As shown in the drawing, the seat-post is in its highest position, being locked by the back of the block 13ª engaging the farther end of the slot within the ear, and hence due to this tie between the parts there can be no further upward movement of the seat-post, the downward movement thereof being similarly limited by engagement of said block with the forward end of the tongue-slot. The seat, not shown, is designed to be supported upon the saddle-bar in any suitable position and can be adjusted thereon longitudinally to suit the rider.

In the operation of the seat-post, it will be obvious that when a sudden shock takes place, the bar 24 will move downward, describing an arc upon its fulcrum or hinge-pin 25. This movement will cause a compression of the coiled spring 18 and a corresponding expansion of coiled spring 19. The only resistance offered to the load in this instance is the opposition of the coiled spring 18, owing to the fact that as the piston rod 15 moves downward the valve-disk will lift and permit free passage of the oil through the ports and restricted vents. Upon the up-stroke or recoil of the post the piston head, however, will retard the movement. This is accomplished through the valve-disk 16, which closes the ports in the piston head and a partial vacuum between the piston head and bottom 10 of the reservoir is obtained, which vacuum is slowly relieved through the restricted vents 17 and thus the device serves as a shock-absorber in conjunction with the coiled spring 19, which spring is compressed upon the up-stroke of the seat-post.

By utilizing a saddle-bar from which the load is applied to the seat-post through a tongue and groove hinge connection, it is obvious that said seat-post can be reciprocated freely without binding and this binding result would attain to the detriment of the movement were the load applied vertically and directly upon said post, which, as shown, is obliquely inclined. Hence it will be seen, owing to the seat-post and saddle-bar being in tongue and groove engagement, that transverse play in the joint is impossible and also that, owing to the hinge connection between the tongue and groove, comprising the slot and pin, the saddle-bar will have free play relative to the rise and fall of the seat-post, said saddle-bar being moved upon an arc of a circle while the seat-post moves in a straight line.

I claim:

1. In a vehicle frame having a horizontally disposed bar, a seat-mast in union with the horizontally disposed frame-bar, a spring-controlled seat-post in telescopic engagement with the seat-mast, and a seat-bar pivotally secured to said frame-bar; the combination of a grooved head extending from the seat-post, a pin carried by the head, a bearing-block loosely mounted upon the pin, and a slotted tongue carried by the seat-bar, the tongue being fitted within the seat-post head groove and having its slot in engagement with the bearing-block.

2. In a vehicle frame having a horizontally disposed bar, an oblique seat-mast in union with the frame-bar, a spring-controlled seat-post in telescopic engagement with the seat-mast, and a seat-bar pivotally secured to said frame-bar; the combination of a head secured to the seat-post, the head being longitudinally grooved and transversely apertured, a pin fitted in the head apertures, a bearing-block loosely mounted upon the pin within the head groove, and a tongue in connection with the saddle-bar, the tongue being provided with a slot engageable with the bearing-block and arranged to have sliding fit within the seat-post head groove.

3. In a vehicle frame having a horizontally disposed bar, and an oblique seat-mast in union therewith, a spring-controlled seat-post in telescopic engagement with the seat-mast, a saddle-bar having one end pivotally secured to the horizontal frame-bar, the saddle-bar and seat-post head being in tongue and groove engagement, and a pin and slot hinge connection between the tongue and groove engaged parts.

In testimony that I claim the foregoing as my own, I have hereto affixed my signature in the presence of two witnesses.

WILLIAM S. HARLEY.

Witnesses:
GEO. W. YOUNG,
E. J. MUELLER.

Copies of this patent may be obtained for five cents each, by addressing the "Commissioner of Patents. Washington, D. C."